United States Patent [19]

Hession

[11] 4,223,062

[45] Sep. 16, 1980

[54] CURL RESISTANT PHOTOPLASTIC FILM

[75] Inventor: Francis P. Hession, Blue Point, N.Y.

[73] Assignee: Bell & Howell Company, Chicago, Ill.

[21] Appl. No.: 960,963

[22] Filed: Nov. 15, 1978

[51] Int. Cl.[2] .............................................. G01D 15/02

[52] U.S. Cl. .................................... 428/216; 428/328; 428/336; 428/483; 428/520; 346/77 E; 346/135.1; 365/126; 355/9

[58] Field of Search ............... 428/215, 414, 483, 378, 428/336, 520; 96/87 R; 346/77 E, 135; 355/9; 365/126; 528/212

[56] References Cited

U.S. PATENT DOCUMENTS

| | | | |
|---|---|---|---|
| 3,147,062 | 9/1964 | Glenn | 346/77 E |
| 3,306,875 | 2/1967 | Hay | 528/212 X |
| 3,484,351 | 12/1969 | Okada et al. | 528/212 |
| 3,545,972 | 12/1970 | D'Cruz | 96/87 R |
| 3,809,473 | 5/1974 | Moraw et al. | 355/9 |
| 3,861,942 | 1/1975 | Guestaux | 96/87 R X |
| 3,895,949 | 7/1975 | Akamastu et al. | 96/87 R X |
| 4,032,338 | 6/1977 | Gange | 346/77 E X |
| 4,077,803 | 3/1978 | Gravel | 355/9 X |
| 4,098,846 | 4/1978 | Olander | 528/212 X |

*Primary Examiner*—George F. Lesmes
*Assistant Examiner*—R. Eugene Varndell, Jr.
*Attorney, Agent, or Firm*—Watson, Leavenworth, Kelton & Taggart

[57] ABSTRACT

A curl resistant transmissively readable photoplastic film is produced having a base ply of polyethylene terephthalate to one side of which is laminated, in sequence, a light transmissive layer of electrically conductive particles, a primer layer of a dimethyl-phenylene oxide polymer, and a photoplastic layer. The latter layer may be formed from a mixture of 75% by weight of an intermediate molecular weight (800–5,000) polystyrene and 25% by weight of a polymolecular plasticizer derived from alpha-methylstyrene to which mixture has been added about 3.3% of the total weight of solids of very fine particle size copper phthalocyanine. To the other side of the base ply is laminated a layer of a solvent deposited methyl methacrylate polymer. When the photoplastic layer is about 17 to 18 microns thick the methyl methacrylate layer may be about 4 to 6 microns thick.

5 Claims, 1 Drawing Figure

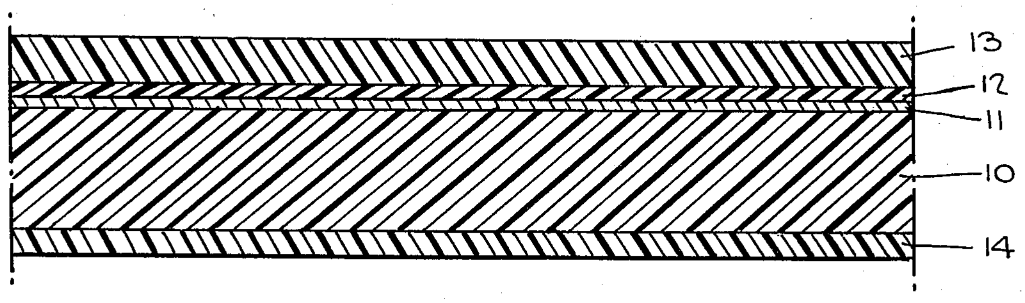
13
12
11
10
14

CURL RESISTANT PHOTOPLASTIC FILM

BACKGROUND OF THE INVENTION

The present invention relates to a transmissively readable photoplastic film on which can be recorded erasable rippled message images. Photoplastic film finds use in both fiche and roll configurations for microfiche and microfilm recording. While the present invention is not limited thereto, it is directed primarily to providing an improved microfiche element.

In U.S. Pat. No. 3,147,062 issued Sept. 1, 1964 for "Medium For Recording", there is described a recording medium in the form of a film having preferably a 4 mil thick base of an optical grade of polyethylene terephthalate on which a conductive film of chromium is vacuum evaporated to a thickness of approximately 35 Angstroms. Onto this conductive film, there is bonded a thermoplastic layer having a thickness of about 7 microns or 0.32 mils of medium molecular weight polystyrene prepared from equal parts of types PS 1 and PS 2 resin produced by the Dow Chemical Company. The type PS 1 polystyrene is stated to have "a molecular weight of about 2,000 (extrapolated from manufacturer's data) and PS 2 has a molecular weight of about 16,500 (measured by osmotic pressure in chloroform)." However, the patent also states that by "medium molecular weight" is meant a molecular weight in the range of 10,000 to 25,000. Although the foregoing is presumably preferred, the patent states that the thermoplastic layer may have a thickness ranging between 0.01 mils and several mils. Additionally, it is disclosed that copper iodine may be used instead of chromium to produce a coating of 150 to 300 Angstroms thick. The conductive layer should have a resistance equal to about 1,000 ohms per square.

In U.S. Pat. No. 3,809,473 issued May 7, 1974 for "Method Of Reproducing A Relief Image" there is described in Example I a method for producing a photoplastic structure by preparing a coating from a mixture of one gram of copper phthalocyanine, 5 grams of low molecular weight poly-2-methylstyrene, (e.g., 276 V 9, marketed by Dow Chemical Company) and 10 grams of polystyrene having an average molecular weight of approximately 30,000, (e.g., PS 3, marketed by Dow Chemical Company).

A photoplastic film formed from a low molecular weight thermoplastic material is described in U.S. Pat. No. 4,077,803 issued Mar. 7, 1978 for "Low Charge-Voltage Frost Recording On A Photosensitive Thermoplastic Medium." More specifically, there is described a recording medium in which the substrate is formed from a commercially available polyester material such as polyethylene terephthalate sold under the "MYLAR" trademark by E. I. du Pont de Nemours and Company. The polyester material has bonded to one surface a thin coating of an electrically conductive material. The patent sets forth as an example a thin coating of sputtered or evaporated aluminum. Onto the conductive coating is bonded by spraying, dipping, or otherwise coating, a layer of a commercial grade of polystyrene thermoplastic resin. The patent states that one such material is commercially available from the Pennsylvania Industrial Chemical Corporation of Clairton, Pa. under the trade name "Piccolastic A-75". Such material is stated to be characterized by an estimated molecular weight of the order of 400 and to have a 75° C. ball-and-ring softening point. As an alternative, there is mentioned a product of Hercules, Inc., of Wilmington, Del. sold under the trade name "Staybelite Ester 10" and which is a glycerol ester of hydrogenated resin. In this particular composition, copper phthalocyanine is added in a quantity of about 8 percent. The thickness of the thermoplastic layer is stated to be adjusted from 3 to 8 microns although the patent states elsewhere that layers varying in thickness from 1.2 to 7 microns are found useful.

In copending U.S. patent application Ser. No. 873,932 filed Jan. 31, 1978 for "Photoplastic Film Recording and Monitoring Apparatus", there is described and claimed a combination recording and monitoring machine for use with the transparent form of photoplastic microfiche. A typical fiche has a rectangular configuration measuring about 105 mm. long by 148 mm. wide with 98 message image-bearable panel or frame areas 12.5 mm. long by 10 mm. wide in a rectilinear pattern of seven transverse or lateral rows with fourteen such panel or frame areas in each row. Because of the large magnification involved, the film must be capable of high resolution, and the machine must afford accurate control of the optics for establishing sharp focus of projected images. It should be readily understood that an important requirement for the fiche is that it should lay flat and not tend to curl. Curling interferes with handling of the fiche and can detract from image quality.

An important requirement of a recording process is permanence except when deliberate erasure is desired. It was discovered, however, that a photoplastic film produced from a formulation of the type described in U.S. Pat. No. 3,809,473 suffered a 25 percent decrease in image contrast retention when exposed to a temperature of 40° C. after a mere 220 hours. Fortunately, a reduction in the quantity of plasticizer, i.e., the alpha-methylstyrene resin, to 25 percent extends the time for equivalent image reduction from 220 hours to 4,600 hours at the same temperature exposure. Extrapolating it can be shown that at 20° C. and a plasticizer concentration of 25 percent the film should survive about 160,000 hours before experiencing a 25 percent reduction in image contrast.

Unfortunately, the high molecular weight polystyrene type PS 3 is no longer manufactured. A polymer of lower molecular weight but higher softening point has been substituted. In combination with 25 percent plasticizer there is produced a film of comparable image producing quality. However, the substitution of resin and/or reduction of plasticizer was accompanied by a manifestation of a tendency of the film to curl, with its attendant drawbacks.

SUMMARY OF THE INVENTION

In accordance with an aspect of the present invention, there is provided a transmissively readable photoplastic film having a base ply of flexible transparent polymeric material to one side of which is laminated, in sequence, a light transmissive layer of electrically conductive particles, a primer for aiding bonding, and a photoplastic layer, and to the other side of which is laminated a layer of different polymeric material of sufficient thickness and physical properties to prevent significant curl of the film. More particularly, it was discovered that curl in the film could be reduced to tolerable limits by coating the reverse side of the base ply with a thin layer of methyl methacrylate polymer.

BRIEF DESCRIPTION OF THE DRAWING

The invention will be better understood after reading the following detailed description of the presently preferred embodiments thereof with reference to the appended drawing in which:

The sole FIGURE illustrates schematically the laminar structure of the photoplastic film constructed in accordance with the present invention.

DESCRIPTION OF THE PREFERRED EMBODIMENTS

Referring now to the drawing, there is shown schematically, without any attempt at scale, the relative relationship of the various plies making up the laminar construction of the photoplastic film. The film is shown as having a base ply 10 of flexible transparent polymeric material to one side of which is laminated in sequence a light transmissive layer 11 of electrically conductive particles, a primer 12 for aiding bonding, and a photoplastic layer 13. To the other side of the base layer 10 is laminated a layer 14 of a different polymeric material of sufficient thickness and physical properties to prevent significant curl of the overall film structure.

The base ply 10 may be formed from any optical grade, transparent, thermally and dimensionally stable material. It is presently preferred to employ a sheet of polyethylene terephthalate having a thickness of about 4 mils. Such material is available commercially from various companies.

Onto one surface of the base ply 10 is applied the conductive layer 11. Said conductive layer must be reasonably transparent and water white or nearly so. While the highest possible transmissivity is desired, a transmissivity of approximately 70% is considered acceptable. Materials such as chromium, gold, indium oxide, indium-tin oxide, cuprous iodide and non-stoichiometric copper sulfide have been used successfully, although gold is presently preferred. In the present film, the conductive coating serves as a ground plane for establishing the electrostatic charges on the photoplastic film surface which are subsequently converted into the rippled surface upon the application of heat thereto.

In order that the photoplastic layer may adhere securely to the conductively coated substrate, there is next overlaid a primer coat 12. This layer enhances adhesion of the next and final layer and also overcoats scratches and pits thereby enhancing optical clarity. The primer layer 12 should be as thin as possible while accomplishing its intended purpose. Dimethyl-phenylene oxide polymer is known to be extremely miscible with polystyrene and its homologs. It is an excellent engineering plastic and adheres very tightly to virtually all the conductive materials mentioned above. It forms very smooth, uniform, ultra thin films and is considered excellent as a primer. Presently estimated thickness of the dimethylphenylene oxide polymer layer is about 0.25 microns. In addition, its refractive index is very nearly equal to that of "Mylar" polyethylene terephthalate which is preferred for the base ply 10.

The presently preferred photoplastic film layer 13 consists of a physical mixture of polystyrene and polyalphamethyl styrene. The ratio of the former to the latter can be varied depending on the properties desired from about 2:1 to about 6:1. It is this ratio that determines properties such as image stability, development and erasure temperatures and even optical contrast as well as apparent photosensitivity. To the foregoing mixture is added very fine particle size copper phthalocyanine which is distributed throughout. Its concentration is presently preferred at about 3.3% of the total weight of solids when the polystyrene resin is about 75% and the polyalpha-methyl styrene is about 25%, by weight, of the solids. While film thicknesses from approximately 3 to more than 25 microns are feasible, it is presently preferred to produce the photoplastic film layer with a thickness of between 17 and 18 microns.

The presently preferred polystyrene resin is produced by Hercules, Inc., Wilmington, Del., under its type designation Piccolastic D resin-D150. This resin is one of a series of intermediate molecular weight (800–5,000), light-colored, nonpolar, thermoplastic hydrocarbon resins derived from pure styrene monomer. The type D150 resin has a softening point by the ring-and-ball method ranging between 143° and 149° C. The presently preferred plasticizer is Dow resin 276-V9 obtained from Dow Chemical Company, Midland, Mich. Said resin is a polymolecular product derived from alpha-methylstyrene.

In order to reduce curl of the film to tolerable limits there is applied to the opposite side of the base ply 10 a coating 14, preferably of methyl methacrylate polymer with a thickness of about 5 microns. The presently preferred anti-curl coating composition is obtained from Rohm & Haas of Philadelphia, Pa., under their type designation Acryloid A-101. This material is supplied as a 40% solids solution in methylethyl ketone. It is a methyl methacrylate polymer. However, polymers such as styrene-methyl-methacrylate copolymers, polycarbonate, polyphenylene oxide, polysulfones and other co- or ter- polymers of styrene, methylacrylate and maleic anhydride should be equally effective as a layer for resisting curl. It will be understood that complete elimination of curl cannot be assured by the inclusion of the anti-curl layer, but it does, when related properly to the photoplastic layer, reduce curl to tolerable limits.

The thickness of the coating 14 is believed, at present, to be related to the thickness and composition of the photoplastic layer 13. That is, it has been found that reducing the thickness of layer 14, all other parameters remaining the same, will result in increased curl. The exact mechanism, however, is not presently understood. Nevertheless, it is apparent that the photoplastic layer may be varied considerably while by appropriate change in thickness of the coating 14, curl can be substantially suppressed.

Another use for the coating 14 is to control deliberately the amount of curl so that the photoplastic film can be used against a curved surface.

Actual production of film in accordance with the foregoing has been accomplished with satisfactory results. Such production has utilized for the base ply 10 and conductive layer 11 a sub-assembly manufactured by Sierracin Corporation of Sylmar, Calif. That company describes its material as a high clarity polyester film bearing a continuous, transparent, electrically conductive coating of vacuum-deposited metal thin film. The metal is overcoated with a proprietary ceramic coating which serves to increase visible light transmission and to provide a measure of mechanical protection to the conductive metal deposit. The ceramic coating also exhibits substantial electrical conductivity through its thickness. From the standpoint of the present application, the composite ceramic coated metal layer may be considered as a single conductive layer. It is possible to apply the primer layer 12 directly to the metal but satisfactory results have been obtained by applying it to the ceramic coated surface. The particular film obtained from Sierracin Corporation is sold under its "Intrex" trademark.

Satisfactory microfiche elements have been fabricated from the subject film in rectangular shape 117.5 mm.×148 mm. The reason for the extra length is to enable a wide stripe of eye legible material which will accept writing by pen or pencil to be applied along one edge to the exposed surface of coating layer 14.

Having described the presently preferred embodiments of the subject invention it will be understood that various changes may be effected without departing from the true spirit of the invention as defined in the appended claims.

What is claimed is:

1. A transmissively readable photoplastic film having a base ply of flexible transparent polyester material to one side of which is laminated, in sequence, a light transmissive layer of electrically conductive particles, a primer for aiding bonding, and a photoplastic layer, and to the other side of which is laminated a layer of a different polymeric material of sufficient thickness and physical properties to prevent significant curl of the film, said photoplastic layer having a thickness of about 17 to 18 microns and containing an intermediate molecular weight styrene polymer having a softening range above 116° C. but below the softening point of said base ply material, a modifying constituent, and an effective amount of copper phthalocyanine, said layer of a different polymeric material having a thickness of about 4 to 6 microns and consisting essentially of a solvent deposited methyl methacrylate polymer.

2. A film according to claim 1, wherein said styrene polymer, plasticizer and copper phthalocyanine are present in the approximate proportional relationship by weight of 3:1:0.132.

3. A film according to claim 1, wherein said base ply has a thickness of about 4 mils and consists essentially of polyethylene terephthalate, and said primer is present in a layer having a thickness of about 0.25 microns and consists essentially of a dimethyl-phenylene oxide polymer.

4. A film according to claim 1, wherein said modifying constituent is an alpha-methylstyrene plasticizer.

5. A transmissively readable photoplastic film having a base ply of flexible transparent polyester material to one side of which is laminated, in sequence, a light transmissive layer of electrically conductive particles, a primer for aiding bonding, and a photoplastic layer, and to the other side of which is laminated a layer of a different polymeric material of sufficient thickness and physical properties to prevent significant curl of the film, said photoplastic layer having a thickness of about 17 to 18 microns and containing a styrene polymer of intermediate molecular weight within the range of about 800 to 5,000 and a softening point below the softening point of said base ply material, a modifying constituent, and an effective amount of copper phthalocyanine, said layer of a different polymeric material having a thickness of about 4 to 6 microns and consisting essentially of a solvent deposited methyl methacrylate polymer.

* * * * *